United States Patent
Sidi et al.

(10) Patent No.: US 6,282,562 B1
(45) Date of Patent: Aug. 28, 2001

(54) METHOD FOR ECONOMICALLY SUB-OPTIMIZING INTERACTIONS IN DATA-COMMUNICATIONS NETWORK ENVIRONMENTS, AND A DEVICE ACCORDING TO THE METHOD

(75) Inventors: Eli Sidi, Markeret Batya; Shlomi Pongranz, Holon; Ovad Somech, Rishon Lezion; Ilan Raab, Rosh Haain; Yaron Bielous, Tel Aviv, all of (IL)

(73) Assignee: Net Reality, Petach Tikva (IL)

( * ) Notice: Subject to any disclaimer, the term of this patent is extended or adjusted under 35 U.S.C. 154(b) by 0 days.

(21) Appl. No.: 09/229,746

(22) Filed: Jan. 14, 1999

(51) Int. Cl.⁷ ....................................... G06F 13/00
(52) U.S. Cl. ............................. 709/105; 709/224
(58) Field of Search ............................ 709/105, 223, 709/224

(56) References Cited

U.S. PATENT DOCUMENTS

| | | | |
|---|---|---|---|
| 5,915,095 | * 6/1999 | Miskowiec | 709/223 |
| 6,003,079 | * 12/1999 | Friedrich et al. | 709/224 |
| 6,044,060 | * 3/2000 | Jones | 370/230 |
| 6,141,686 | * 10/2000 | Jackowski et al. | 709/224 |

OTHER PUBLICATIONS

Computer and Communication, "Standards (and 38 Cross R$_{efe}$rences)", 1–8, (1998).

Workflow software, "Workflow Related Internet Resources", 1–13, Jan., 1999.

Decision–Wait, "Decision–Wait", 1–4, (1995–1998).

Frame Relay Commands, "Frame Relay Commands", 1–67, (1999).

Frame Relay Commands, Cisco Systems Inc., (1989–1998).

V. Jacobson, "TCP Extensions for Long–Delay Paths", 1–13, Oct., 1988.

"High Performance TCP/IP communications with HPs AND IBMs connected around an Ancor Fibre Channel Fabric" WebMaker, Nov., 1994.

* cited by examiner

Primary Examiner—Kenneth R. Coulter
(74) Attorney, Agent, or Firm—Browdy and Neimark

(57) ABSTRACT

Strategic modifications in traffic shaping, load balancing or the like are associated with the managing of aspects or characteristics of the transfer of data communications in a network environment. The present system is directed to changing the way humans interact with data communications technologies; and circumstantially to effecting modifications in those automated portions of data communications systems which are sensitive to response time metrics. This changing is accomplished through the introduction of selective increasing of delay in response time which serves to pedagogically discourage human users of data communications systems from economically disadvantageous interactions.

43 Claims, 4 Drawing Sheets

METHOD FOR ECONOMICALLY SUB-OPTIMIZING INTERACTIONS IN DATA-COMMUNICATIONS NETWORK ENVIRONMENTS, AND A DEVICE ACCORDING TO THE METHOD

FIELD OF THE INVENTION

This invention generally relates to a method which effects the way humans decide to interact with data communications in a network environment. More specifically, this invention relates to strategic modifications in traffic shaping, load balancing, or like apparatus, which are associated with the managing of aspects or characteristics of the transfer of data communications in a network environment.

BACKGROUND OF THE INVENTION

Strategic methodological considerations in the data communications network environment are most commonly directed to improving an aspect of the network's efficiency. The aspect may be one of communications speed—to which substantial efforts are directed in the simulations of modified interconnection topologies, and likewise of modified routing protocols. Alternately, the aspect may be one of communications security—to which substantial efforts are directed to encryption, filtering out of potentially armful active executable program fragments (e.g. viruses), and restriction of access (e.g. contents accessible by authorized personnel only, or access restricted absolutely—such as pornography on the Internet).

It is intrinsic for a proper understanding of data communications to consider how the aforesaid aspects have developed in such diverse technologies as telephony, distributed databases, cable television, Internet, and the like. However, for the purposes of brevity, the materials to be cited as characterizing the prior art will be primarily restricted to those related to the Internet. Those knowledgeable in the various data communications technologies are well aware of the overwhelming theoretical similarities between these diverse technologies (so called). However, even for those knowledgeable in the theoretical similarities, seemingly diverse nomenclatures have become a practical burden with the spawning of numerous industry standards and off-the-shelf embodiments.

It should be recalled that data communications in the network environment is propagated using packets of "information", or some conceptual equivalent thereof. These packets undergo various transformations in the course of propagation, and also generally accumulate header information, which allows the packet's information to be reassembled (or reseparated) at the end of the propagation path. It is generally in the aggregation of a statistical profile of these headers that network communications engineers search for clues which suggest how an improved sub-optimizing of response time and other metrics may be achieved.

A general survey of relevant standards may be learned from www.cmpcmm.com/cc/standards.html while more specific standards relevant to the appreciation the limits of the relevant prior art may be learned from www.cisco.com/univercd/cc/td/doc/product/software/ios112 . . . /4cfrelay.html, from www.cern.ch/HSI/fcs/applic/rd11/Nov94/FCS note 1.html and from ftp.sunet.se/ftp/pub/Intemet-documents/rfc/rfc 1072.txt. In addition other relevant aspects of existing methods considered for use in this technological domain may be learned from www.vtt.fi/tte/staff/ojp/workflow.html, and from www.win.tue.nl/cs/pa/edis/sys/decision-wait/index.html.

It can be fairly stated that, with the major exception of security considerations, the motivation of data communications technology is principally directed to improving response time. However there are other relevant considerations in data communications technology, such as costs. Costs (in the present context) relate to amortization of equipment, maintenance of equipment, worker productivity, rate payment structures determining interconnection for the transfer of data communications, and the like.

Often, each of these costs is independently sub-optimized. Amortization and maintenance are considered as for any other equipment that becomes rapidly obsolescent. Productivity is thought to be a mix of security restrictions and the maximizing of response time. Rate payment structures are substantially directed to finding cheaper service providers or to using computational tricks (e.g. compression) in order to achieve higher utilization of the current service provider(s).

There are also relevant psychological factor involved when the one or more persons are parties to a data communications transaction. For example, most people become frustrated with slow response time (e.g. waiting for a dial tone, waiting for a database query response, etc.) while some people become almost addicted to fast response time (e.g. video-like arcade games).

SUMMARY OF THE INVENTION

In juxtaposition to the prior art, the method (and device) of the present invention are directed to changing the way humans interact with data communications technologies; and circumstantially to effecting modifications in those automated portions of data communications systems which are sensitive to response time metrics. This changing is accomplished through the introduction of selective increasing of delay in response time. This intentional application of response time degradation serves to pedagogically discourage human users of data communications systems from economically disadvantageous interactions.

For example, consider a work environment where employees are allowed to surf the Internet and where simultaneously customer ordering and service are provided via the same connections to the Internet. If the economic benefits (accruing from this work environment by ordering and service) are deemed to be more important than the surfing activity (and the surfing activity is nevertheless deemed to be a permissible or even a necessary activity), then the present invention introduces a degradation in response time to the surfer during those times when customer ordering and services are actually or potentially requiring access to the Internet connections.

Another example relates to educating a class of employees away from regular use of recreational data communications activity (e.g. Internet surfing or private phone calls) by imposing a stochastic increase in response time for these activities. For example, consider the internal telephone system of a large private concern (e.g. a geographically distributed corporation whose offices are interconnected through the corporation's PBX or through Wide Area Network packet telephone transfer interconnection facilities).

At times when the packet transmission rate between offices is actually or potentially approaching peak load capacity, the PBX has three known basic options. Firstly, the PBX may fail to deliver a dial tone to new requests for line services until the load has diminished. Secondly, the PBX may apply to an external service provider for temporary expensive supplemental interconnections. Thirdly, the PBX may degrade all services provided (using packet delay and packet loss) in order to provide an equitable level of services to all applicants for line services.

According to the present invention (for this PBX-type example), a telephone service priority metric is established for each user. For example, the metric may weigh two factors: the degree to which use of the inter-office telephone is part of the users job function; and the rank of the user as an employee. Together the weighing of these two factors will produce a metric such that the central operator has priority over the president of the company, who in turn has priority over the company's security personnel, who in turn has priority over the company's vice presidents, etc.

Using this example metric, when the packet transmission rate between offices is actually or potentially approaching peak load capacity, the PBX assigns a packet delay time in proportion to the designated metric (as can be measured from the header content of each packet). This causes workers who do not have internal telephone related job functions and who do not have high employee rank to decide to tell the party with whom they a speaking "... seems to be a problem with the phones today . . . I'll talk to you tomorrow". Eventually these types of employees learn or otherwise habituate to not use the internal telephone system during peak load periods. To a lesser degree, intermediate metric users are likewise habituated; while priority metric users never experience any degradation of service due to peak loads.

The present invention relates to a method for economically sub-optimizing interactions in data communications network environments. Furthermore, the present invention relates to devices used to implement the method of the present invention.

The method, for economically sub-optimizing interactions in data communications network environments, according to the present invention includes the steps of:

(a) aggregating a statistical profile of data communications, substantially from a vantage of a predetermined node, wherein this node is located between firstly an isolatable sub-network of the network environment having at least one interactive participant and secondly a preponderance of the remaining network environment;

(b) electing at least one data communications traffic load threshold from the statistical profile according to a substantially economic consideration;

(c) substantially at the node, assigning a parametric data transfer delay interval to each data communication exceeding the threshold;

(d) effecting the delay by storing each assigned data communication for the interval before transferring the data communication substantially across the node, wherein the sub-network includes a participant of the at least one interactive participant, and the participant is a sender or an intended receiver of the data communication.

The present invention also relates to a device for effecting delay in a data communications network environment, wherein the device has two sides to be connected in the environment substantially as a non by-passable interconnection between on a first side at least one interactive participant of an isolatable sub-network of the environment and on a second side a preponderance of the remaining environment. This device includes:

(a) a receiving port for accepting data communications on the first side of the two sides;

(b) a transfer delay interval assigning module connected to the receiving port, the assigning module associating a delay interval metric to each data communication that is exceeding a predetermined traffic load threshold metric;

(c) a data communications storage module connected to the assigning module, wherein each data communication is stored therein for the associated delay interval; and (d) a transmitting port connected to the storage module, the transmitting port being for transmitting data communications on the second side of the two sides.

The present invention also relates to other variations of this device, as will be described in detail forthwith.

NOTE: It should be appreciated that while the preferred embodiment of the present invention relates to a controlled smart application of data transfer delay intervals, there are equivalent mechanisms that are also applicable herein. For example, lowering the traffic load queue priority of a packet is often equivalent to assigning a delay to the packet. This is the case when the server is busy with a high traffic load. However, when the server is not busy with a high traffic load, the use of priority lowering is not equivalent to intentional delay interval assignment. Since the present invention relates to various implementations and weighting factors when assigning delay intervals, it should be appreciated that for many (but not all) of these factor scenarios, priority lowering is equivalent to delay interval assignment.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the context of the present invention, "data communications" relates to any electrical signal which is propagated in a system, wherein the signal contains a digital or an analog, representation of data, text, audio content, visual content, or the like, or any combination thereof. This is intended to include telephone communications, file transfers, command-control transactions, hypertext, Virtual Reality Modeling Language executions, voice, graphics, photos, music, or the like. Data communications also relates to the packets of content into which these signals may be divided or aggregated. There are also substantial equivalents to packeting; such as line switching/allocation, dynamic frequency modulation, multiplexing, etc.

Furthermore, there are certain topological notions and their generalizations that are important for the proper appreciation of the present invention. Specifically, in FIGS. 1–5 the nomenclature "isolatable sub-network" and "substantially across a node" can be more readily understood.

Another important topological notion, in the context of the present invention, relates to interconnection in data communications networks. For simplicity of illustration and explanation, these interconnections are illustrated and described as if they are simple single lines. In actuality, the number of lines depends on many complex factors; among which bandwidth requirements, protocol, and line-quality are the most significant. In large scale data communication networks there often exist complex conduits; which may be de-convoluted into constituent components of multiplexing modules, inverse multiplexing modules, and the lines which interconnect them into a functioning data communications conduit. For example, there are data communications interconnections between two nodes that use multi-link PPP or frame-relay protocol. There are also single nodes that interconnect between disparate numbers of lines (e.g. a traffic shaper (node) that interconnects a single LAN with a plurality of WANs). Therefore, it should be appreciated that the present invention is applicable to environments having interconnections where two nodes are connected via several links employing multiplexing techniques; and equivalently for single nodes interconnecting between disparate numbers of lines.

Figure 1:
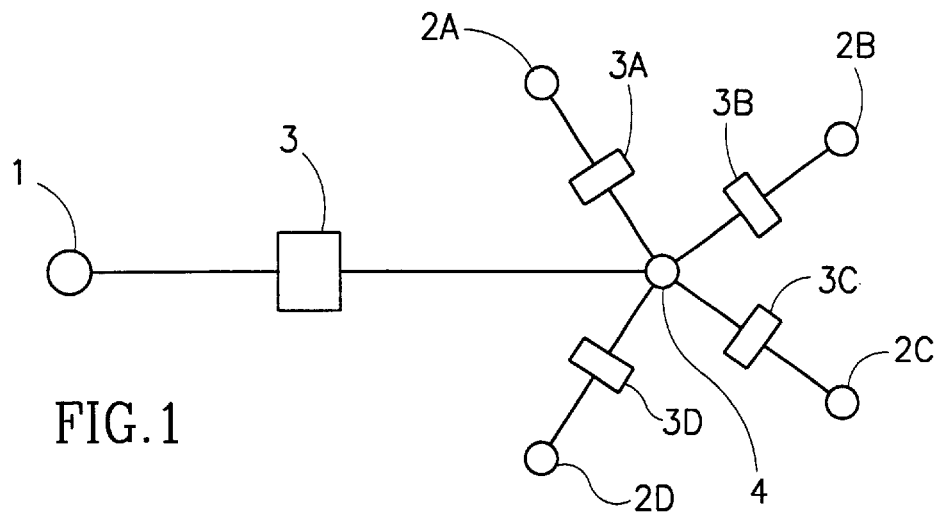
FIGS. 1–5 are schematic illustrations of network environments wherein the nomenclature "isolatable sub-network" and "substantially across a node" can be more readily understood.

FIG. 1 shows a simple data communications network having a star topology. Interactive participants (1) and (2a, 2b, 2c, 2d) are interconnected to the routing hub of the star (4). Participant (1) is an isolatable sub-network with respect to the hub and the other participants (2a . . . 2d). All data communications between participant (1) and the other participants (2a . . . 2d) must traverse a node (3), which is substantially equivalent to saying that these data communications must transverse one of (3a, 3b, 3c, or 3d). Hence, substantially across a node (3) is equivalent to across the group including nodes (3a, 3b, 3c, and 3d). When the processing at node (3) is only with respect to "some" of the data communications traversing, then substantially across a node (3) is equivalent to across at least one node of the group including nodes (3a, 3b, 3c, and 3d); wherein the weighting of data communications selection is (can be) normalized to be equivalent the amount of the "some" of the data communications.

Figure 2:
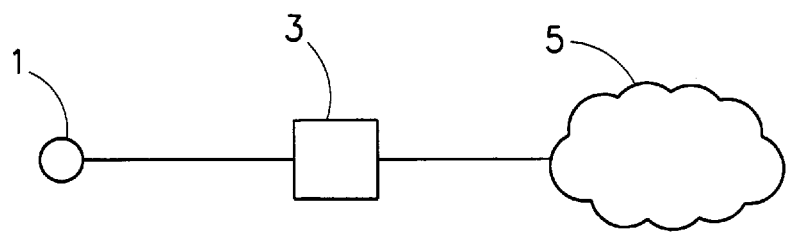

FIG. 2 shows a simple data communications network having a wide area network (5). Interactive participant (1) is interconnected to other interactive participants (who are "members" of the wide area network—WAN). Participant (1) is an isolatable sub-network with respect to the WAN and the other participants therein. All data communications between participant (1) and the other participants must traverse a node (3).

Figure 3:
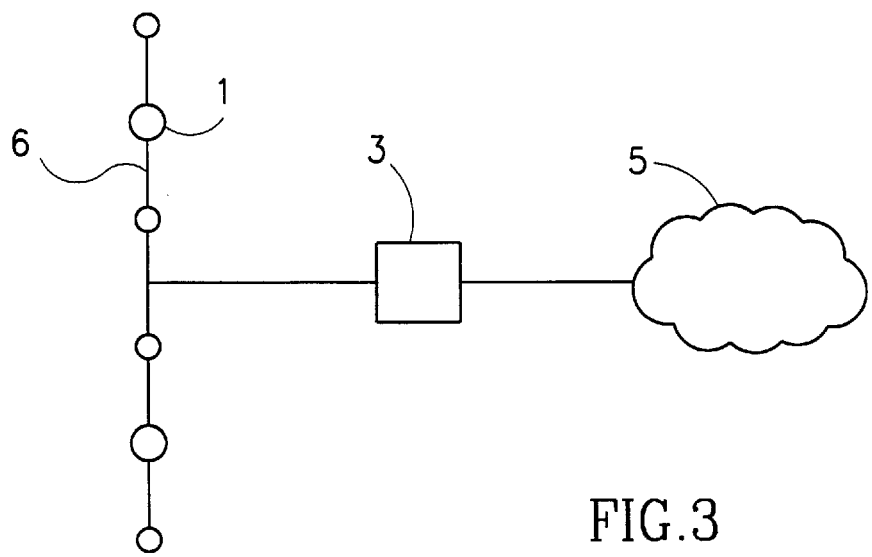

FIG. 3 shows a simple data communications network having a local area network (6) and a wide area network (5). Interactive participant (1) is interconnected to other interactive participants (that are "members" of the wide area network—WAN) and to other interactive participants that are "members" of the local area network—LAN. The LAN is an isolatable sub-network with respect to the WAN. All data communications between participants of the WAN and participants of the LAN must traverse a node (3). However, data communications between members of the WAN (5) do not traverse node (3), and likewise data communications between members of the LAN (6) do not traverse node (3).

Figure 4:
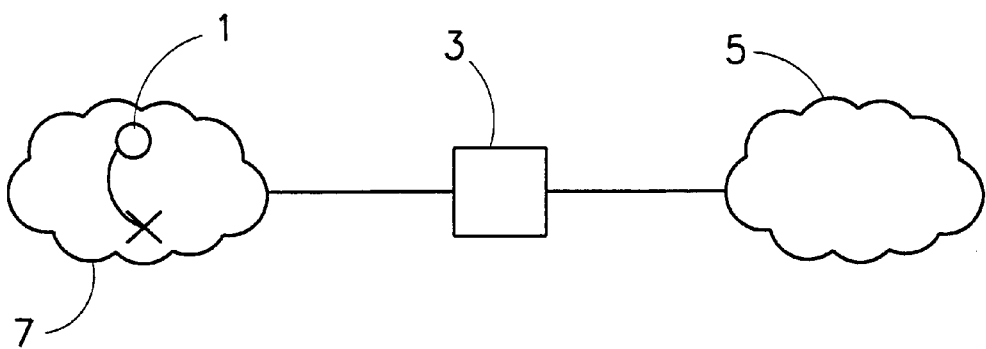

FIG. 4 shows a data communications network having a wide area network (7) and a wide area network (5). Interactive participant (1) is interconnected to other interactive participants—that are "members" of the wide area networks. The WAN (7) is an isolatable sub-network with respect to the WAN (5). All data communications between participants of the WAN (7) and participants of the WAN (5) must traverse a node (3). However, data communications between members of the WAN (7) do not traverse node (3).

Figure 5:
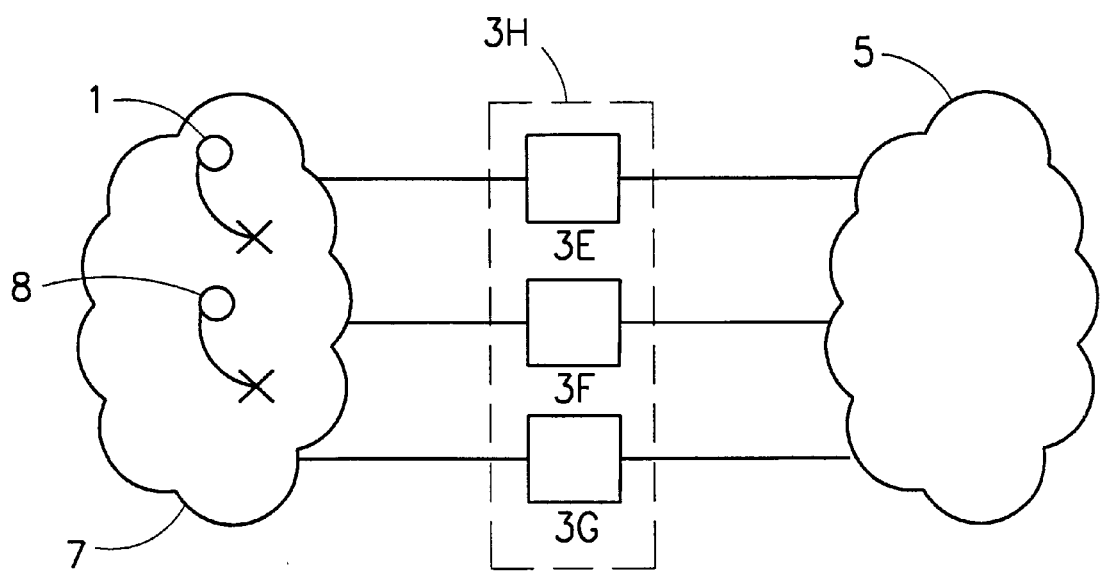

FIG. 5 shows a data communications network having a wide area network (7) and a wide area network (5). Interactive participant (1) is interconnected to other interactive participants—that are "members" of the wide area networks. The WAN (7) is an isolatable sub-network with respect to the WAN (5). All data communications between participants of the WAN (7) and participants of the WAN (5) must traverse a node (3h). Node (3h) is substantially equivalent to the collection of nodes (3e) (3f) (3g). However, data communications between members of the WAN (7) (e.g. between participants (1) and (8)) may or may not traverse node (3h). The routing of the data communication may proceed directly within WAN (7) or it may traverse via WAN (5).

Furthermore, it should be noted that substantially applying a stochastic increase in response time at node (3h) is equivalent to applying a weighted stochastic increase at one or two of nodes (3e) (3f) and (3g). This could also be stated in relating (see FIG. 1) node (3) with the collection of nodes (3a, 3b, 3c, and 3d).

Figure 6:
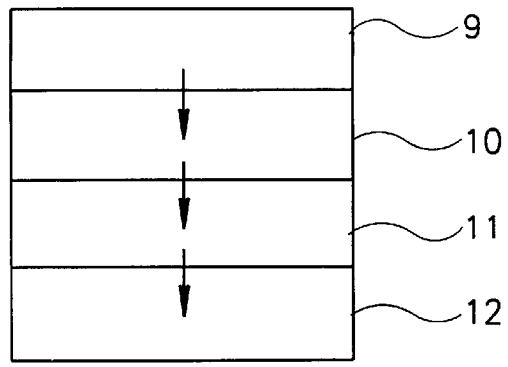
FIG. 6 is a schematic illustration of steps according to the method of the present invention.

The present invention relates to a method (see FIG. 6) for economically sub-optimizing interactions in data communications network environments.

This method includes the steps of:

(a) Aggregating (9) a statistical profile of data communications, substantially from a vantage of a predetermined node. The node is located between firstly an isolatable sub-network of the network environment having at least one interactive participant and secondly a preponderance of the remaining network environment. This aggregation may be accomplished:
by logging information from packet headers (e.g. sender or receiver) at the predetermined node; or
by examining packet contents (e.g. HTML page, email contents, notations indicating specific a specific transaction, or the like); or
by logging the information at a larger number of nodes and thereafter approximating the data so collected for the predetermined node.

This aggregation may be accomplished from logging header information at the routers (in WAN) or by significant sampling of a portion of data communications at a portion of nodes (for very large systems). The specific nature of the aggregating the data, as summarized into a statistical profile, and the accuracy of the profile are all directly associated with the nature of the economic sub-optimization desired. The specific data elements collected and their method of collection are essentially familiar to those who undertake load studies in conjunction with those who undertake cost-benefit analyses.

(b) Electing (10) at least one data communications traffic load threshold from the statistical profile according to a substantially economic consideration.

The statistical profile must be analyzed and a metric must be constructed which will effect a functional reallocation of limited communications interconnection resources during actual or potential peak load periods. Implementation of the present system during actual peak load periods is dependent on having a peak load monitor while implementation during potential peak load periods can be "scheduled" from the data collected to form the profile. It should be appreciated that there are a number of applicable "peak loads" (e.g. server packet-transferring peak load, server associated administrative activity peak load, network throughput peak load, etc.); and that some of these are not readily monitored.

(c) Substantially at the node (whose vantage was of concern in step (a)), assigning (11) a parametric data transfer delay interval to each data communication exceeding the threshold.

The parametric delay interval is a related methodological unit for "encouraging" acceptance of the load sharing. For example, if the profile is only used to isolate potential peak periods then the parametric delay may assign the amount of delay according to factors such as employee status, job function description, time of day, etc.

(d) Effecting (12) the delay by storing each assigned data communication for the interval before transferring the data communication substantially across the node. The sub-network includes a participant of the at least one interactive participant. The participant is a sender or an intended receiver of the data communication. The storing is in a queue, a periodically re-sorted list, a time delay buffer, a transmission scheduler, or the like.

According to the preferred embodiment of the method of the present invention, aggregating a statistical profile of data communications includes traffic load metrics with respect to a variable selected from the list:

Time of day

Day of week

Day of month

Day of year (e.g. regular work day, holiday, etc.)

Sender (e.g. name, ID, etc.)

Categorization of sender (employee status, customer status, supplier status, etc.)

Intended receiver (e.g. name, ID, etc.)

Categorization of intended receiver (employee status, customer status, supplier status, etc.)

Size of data communications (e.g. bandwidth required, time of transmission, number of packets, Media content category of data communications (e.g. Telephone, multimedia, electronic funds transfer, etc.)

Transactional category of data communications (e.g. Customer ordering, customer service, management, maintenance, etc.)

Rate-structure effecting data communications (e.g. service provider, contract terms for guaranteed service and for peak load service, rate tables, etc.)

Delay Sensitivity

Minimum Requirements

Maximum Requirements

In general, the most manageable cost factor is the rate structure effecting data communications, and accordingly great cost saving can presently be achieved in WAN base systems if the bandwidth of the constant communications load can be kept within a controlled limit.

The present invention is directed to changing the way humans interact with data communications technologies; and circumstantially to effecting modifications in those automated portions of data communications systems which are sensitive to response time metrics. According to the preferred embodiment of the method of the present invention, a computer is the participant of the at least one interactive participant. Having a computer as the active participant more easily enables automatic load monitoring, balancing, and limiting. Furthermore, according to the preferred embodiment of the present invention, the computer is substantially operating according to interactive human control. According to other embodiments of the present invention, the participant is a telephone, or a radio or microwave transmitter/receiver, or a remote camera/monitor, or the like. While interactive human control may be enabled via a computer or directly, the enabling of devices according to the method of the present invention is more efficient for the habituation of the human when the human interaction is via a computer.

According to the preferred embodiment of the method of the present invention, the preponderance of the remaining network environment includes a wide area network or a portion thereof Determination of measure with respect to "preponderance of the remaining network environment" can be assigned by available bandwidth, number of packets traversing in an average time interval, number of registered active-participants, or the like. According to other embodiments of the present invention, the network environment may constitute or include a wide are network, a wireless network, a metropolitan area network, a local area network, a non-packet oriented network, etc. Recall that a motivation of the present invention relates to "changing the way humans interact with data communications technologies." Thus it is not the data communications technology per se that is of concern, but rather the human interactions therewith.

According to the preferred embodiment of the method of the present invention, a substantially economic consideration relates:

to either an aspect of a monetary payment rate structure effecting data communications;

or to an aspect of a monetary payment rate structure effecting time of the participant of the at least one interactive participants.

According to one embodiment of the method of the present invention, the assigning of a parametric data transfer delay interval is determined according to an econometric model. The econometric model relates cost-type variables to data communications measurable variables (from the aggregation) in order to identify possible sub-optimization regions in the resultant model.

According to another embodiment of the method of the present invention, the assigning of a parametric data transfer delay interval is determined according to a feedback model. The feedback model considers how the assignment of stochastic, progressive, or deterministic delay metrics effect productivity, integrate into the normal work activity as habituation, effect attitudes, etc.

According to the preferred embodiment of the method of the present invention, aspects of the feedback model are equated as economic entities and are incorporated into a feedback sensitive economic model.

The present invention also relates to device embodiments wherein significant aspects of the method of the present invention are incorporated.

Figure 7:
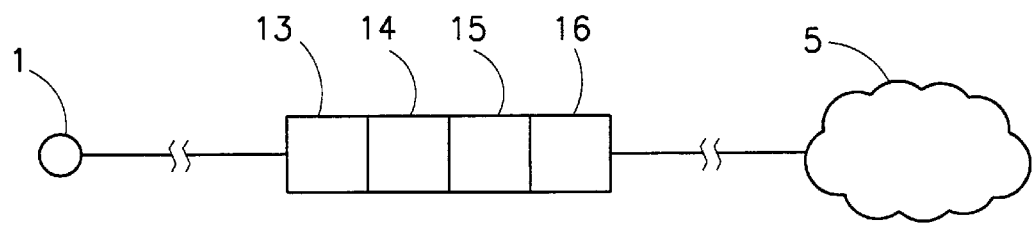
FIGS. 7–10 are schematic illustrations of embodiments of the device of the present invention.

The present invention relates to a first embodiment of a device for effecting delay in a data communications network environment (see FIG. 7). The first embodiment device has two sides to be connected in the environment substantially as a non bypassable interconnection between on a first side at least one interactive participant (1) of an isolatable sub-network of the environment and on a second side a preponderance of the remaining environment (5).

This first embodiment of a device according to the present invention includes:

(a) A receiving port (13) for accepting data communications (on a packet by packet basis or the like) on the first side of the two sides.

(b) A transfer delay interval-assigning module (14) connected to the receiving port. The assigning module associates a delay interval metric to each data communication (on a packet by packet basis or the like) that is exceeding a predetermined traffic load threshold metric.

(c) A data communications storage module (15) connected to the assigning module, wherein each data communication (on a packet by packet basis or the like) is stored therein for the associated delay interval.

(d) A transmitting port (16) connected to the storage module. The transmitting port is for transmitting data communications (on a packet by packet basis or the like) on the second side of the two sides.

Figure 8:
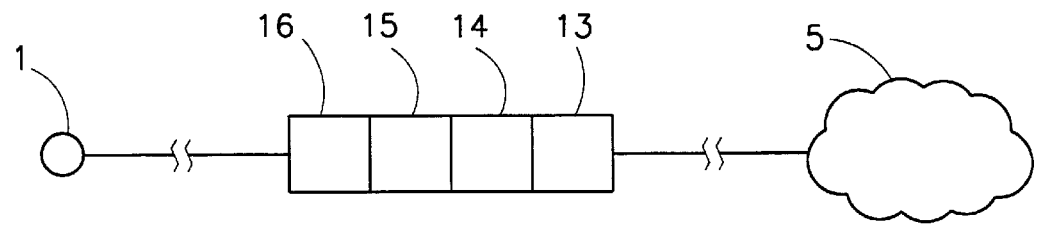

According to a significant variation (see FIG. 8) of this first embodiment, the orientation of the device is reversed such that the receiving port (13) is for receiving on the second side of the two sides and the transmitting port (16) is for transmitting to the first side of the two sides. Substantially the first embodiment and its variation are identical, however the first embodiment imposes the delay before the participant injects a data communications into the network environment, while the variation embodiment delays delivery of data communications from the network environment to the participant.

Figure 9:
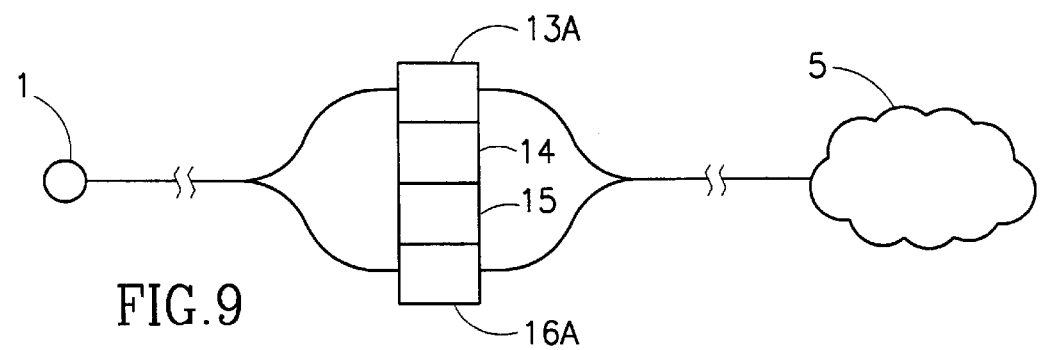

The present invention also relates to a second embodiment of a device for effecting delay in a data communications network environment (see FIG. 9). The second embodiment device has two sides to be connected in the environment substantially as a non bypassable interconnection between on one side at least one interactive participant (1) of an isolatable sub-network of the environment and on the other side a preponderance of the remaining environment (15).

This second embodiment of a device according to the present invention includes:

(a) A receiving port (13a) for accepting data communications (on a packet by packet basis or the like) on either side of the two sides, and the receiving port designates each data communication with the side appropriate for its eventual transmission.

(b) A transfer delay interval-assigning module (14) connected to the receiving port. The assigning module associates a delay interval metric to each data communication (on a packet by packet basis or the like) that is exceeding a predetermined traffic load threshold metric.

(c) A data communications storage module (15) connected to the assigning module, wherein each data communication (on a packet by packet basis or the like) is stored therein for the associated delay interval.

(d) A transmitting port (16a) connected to the storage module. The transmitting port is for transmitting each data communications (on a packet by packet basis or the like) on the appropriate side as designated by the receiving port.

Figure 10:
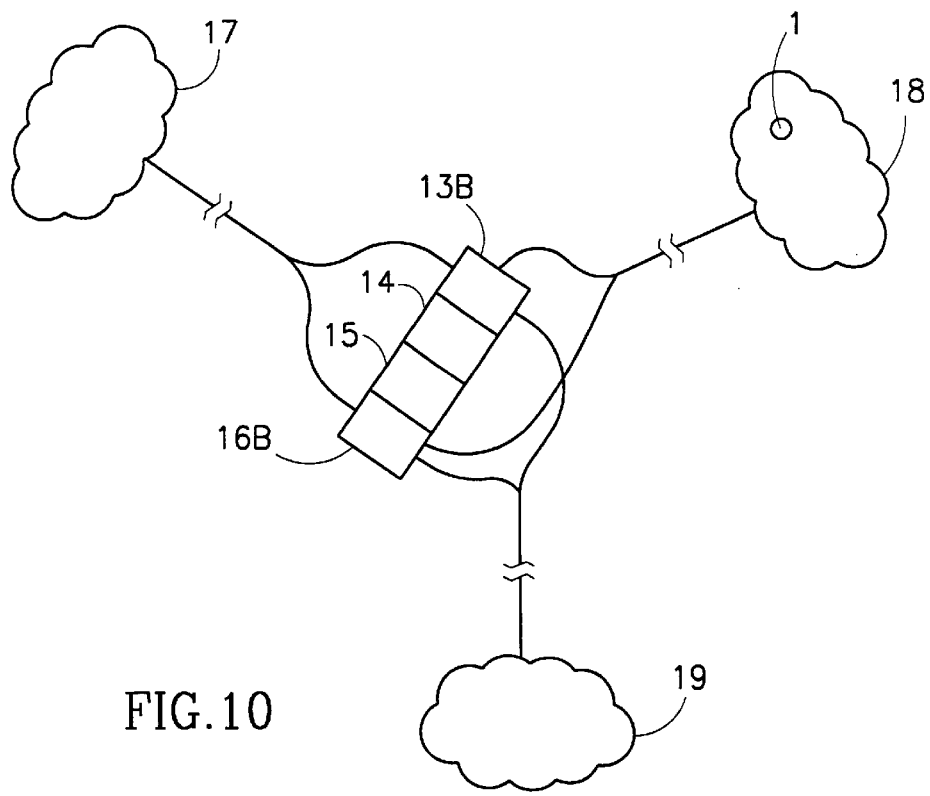

The present invention also relates to a third embodiment of a device for effecting delay in a data communications network environment (see FIG. 10). The third embodiment device has more than two sides, to wit: an aggregation (17) (18) of at least one of the more that two sides for connecting to at least one interactive participant of an isolatable sub-network of the environment and the remaining at least one side of the more than two sides for connecting to a preponderance of the remaining environment (19).

This third embodiment of a device according to the present invention includes:

(a) A receiving port (13b) for accepting data communications (on a packet by packet basis or the like) on any one of the more than two sides and the receiving port designates each data communication with at least one side of the other sides as appropriate for its eventual transmission.

(b) A transfer delay interval-assigning module (14) connected to the receiving port. The assigning module associates a delay interval metric to each data communication (on a packet by packet basis or the like) that is exceeding a predetermined traffic load threshold metric.

(c) A data communications storage module (15) connected to the interval-assigning module, wherein each data communication (on a packet by packet basis or the like) is stored therein for the associated delay interval.

(d) A transmitting port (16b) connected to the storage module. The transmitting port is for transmitting each data communications (on a packet by packet basis or the like) on each side so designated by the receiving port.

According to an interesting variation embodiment of the third device embodiment, the isolatable sub-network is substantially identical to a preponderance of the remaining environment. For example, this is the case when the device is installed at node 3e or node 3f or node 3g as seen in FIG. 5.

In FIG. 5, WAN (5) and WAN (7) are each "isolatable sub-networks" and are each "substantially identical to a preponderance of the remaining environment" with respect to each other. Installing the device at node 3e or node 3f or node 3g instead of at all three of them (node 3h) does not alter the device per se (at this stage of the developmental presentation of embodiments). However, this topologically ambiguous style of device installation does alter the simple conception of how the device enables implementation of the method of the present invention.

Figure 11:
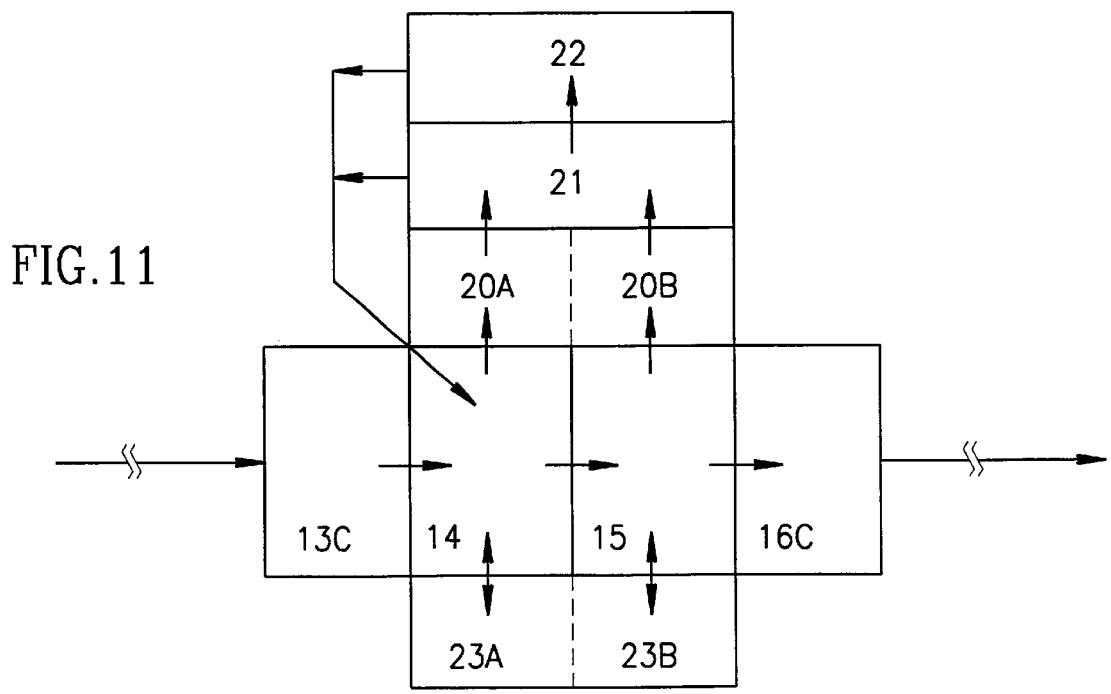
FIG. 11 is a schematic illustration of the preferred embodiment of the device of the present invention

According to the preferred embodiment of the present invention (see FIG. 11) for any of the device embodiments or any variation embodiment thereof, an aggregating module (20a or 20b) is connected to the assigning module or to the storage module. The aggregating module aggregates a statistical profile of data communications. Here the device having an aggregating module is simultaneously used to allow a more complete embodiment of the method of the present invention (hereinafter the "method-enabled device"). Here in FIG. 11 "(13c)" designates any receiving port (13) or (13a) or (13b); and "(16c)" designates any corresponding transmitting port (16) or (16a) or (16b).

According to the preferred embodiment of the method-enabled device of the present invention, an electing module (21) is connected to the aggregating module on one side and to the assigning module on the other side. The electing module elects at least one data communications traffic load threshold from the profile of the aggregating module according to a substantially economic consideration.

According to the preferred embodiment of the method-enabled device of the present invention, at predetermined times or according to predetermined conditions, an updating is performed on the profile of the aggregating module for access by the electing module.

According to the preferred embodiment of the method-enabled device of the present invention, a simulation module (22) is associated with the electing module or with characterizations of an updated profile prior to the profile's access by the electing module. The simulation module substantially compares the delay metric in use with the effects of applying at least one delay metric according to at least one scenario of economic considerations. Thereinafter the simulation module effects a modification of the metric used or of the economic consideration used by the aggregating module— whenever the comparing of a simulated metric or simulated scenario substantially improves on the metric or scenario used by the aggregating module.

According to the preferred embodiment of the present invention for any of the device embodiments or any variation embodiment thereof, at least one service module (23*a* or 23*b*) is associated with the assigning module or with the storage module. The service module includes at least one data communications task selected from the list: traffic monitoring, traffic shaping, encryption, decryption, security filtering, traffic logging, traffic aggregation, traffic fragmentation, or traffic route modification.

The method, device embodiments, and method-enabled device of the present invention allow greater cost savings than the many prior art attempts to independently sub-optimize. Simultaneously the present invention allows any benefits that may be achieved by independent sub-optimization to be used (e.g. use of: Amortization and maintenance improvements may be addressed as for any other equipment that becomes rapidly obsolescent. Productivity improvement may be addressed as a mix of security restrictions and the maximizing of response time. Rate payment structures improvement may be addressed substantially as directed to finding cheaper service providers or to using computational tricks in order to achieve higher utilization of the current service provider(s).). Most significantly the present invention relates to cost savings associated with relevant psychological factor that are involved when one or more persons are parties to a data communications transaction.

What is claimed is:

1. A device for effecting delay in a data communications network environment, wherein the device has two sides to be connected in the environment substantially as a non bypassable interconnection between on a first side at least one interactive participant of an isolatable sub-network of the environment and on a second side a preponderance of the remaining environment, the device comprising:
   (a) a receiving port for accepting data communications on the first side of the two sides;
   (b) a transfer delay interval assigning module connected to the receiving port, said assigning module associating a delay interval metric to each data communication that is exceeding a predetermined traffic load threshold metric;
   (c) a data communications storage module connected to the assigning module, wherein each data communication is stored therein for the associated delay interval; and
   (d) a transmitting port connected to the storage module, said transmitting port being for transmitting data communications on the second side of the two sides.

2. The device according to claim 1 wherein an aggregating module is connected to the assigning module or to the storage module, and said aggregating module aggregates a statistical profile of data communications.

3. The device according to claim 2 wherein an electing module is connected to the aggregating module on one side and to the assigning module on the other side, the electing module electing at least one data communications traffic load threshold from the profile of the aggregating module according to a substantially economic consideration.

4. The device according to claim 3 wherein, at predetermined times or according to predetermined conditions, an updating is performed on the profile of the aggregating module for access by the electing module.

5. The device according to claim 2 wherein a simulation module is associated with the electing module or with characterizations of an updated profile prior to the profiles access by the electing module, said simulation module substantially comparing the delay metric in use with the effects of applying at least one delay metric according to at least one scenario of economic considerations, and thereinafter effecting a modification of the metric used or of the economic consideration used by the aggregating module whenever the comparing of a simulated metric or simulated scenario substantially improves on the metric or scenario used by the aggregating module.

6. The device according to claim 4 wherein a simulation module is associated with the electing module or with characterizations of an updated profile prior to the profiles access by the electing module, said simulation module substantially comparing the delay metric in use with the effects of applying at least one delay metric according to at least one scenario of economic considerations, and thereinafter effecting a modification of the metric used or of the economic consideration used by the aggregating module whenever the comparing of a simulated metric or simulated scenario substantially improves on the metric or scenario used by the aggregating module.

7. The device according to claim 1 wherein at least one service module is associated with the assigning module or with the storage module, the service module including at least one data communications task selected from the list: traffic monitoring, traffic shaping, encryption, decryption, security filtering, traffic logging, traffic aggregation, traffic fragmentation, or traffic route modification.

8. The device according to claim 1 wherein orientation of the device is reversed such that the receiving port is for receiving on the second side of the two sides and the transmitting port is for transmitting to the first side of the two sides.

9. The device according to claim 8 wherein an aggregating module is connected to the assigning module or to the storage module, and said aggregating module aggregates a statistical profile of data communications.

10. The device according to claim 9 wherein an electing module is connected to the aggregating module on one side and to the assigning module on the other side, the electing module electing at least one data communications traffic load threshold from the profile of the aggregating module according to a substantially economic consideration.

11. The device according to claim 10 wherein, at predetermined times or according to predetermined conditions, an updating is performed on the profile of the aggregating module for access by the electing module.

12. The device according to claim 10 wherein a simulation module is associated with the electing module or with characterizations of an updated profile prior to the profiles access by the electing module, said simulation module substantially comparing the delay metric in use with the effects of applying at least one delay metric according to at least one scenario of economic considerations, and thereinafter effecting a modification of the metric used or of the economic consideration used by the aggregating module whenever the comparing of a simulated metric or simulated scenario substantially improves on the metric or scenario used by the aggregating module.

13. The device according to claim 11 wherein a simulation module is associated with the electing module or with characterizations of an updated profile prior to the profiles access by the electing module, said simulation module substantially comparing the delay metric in use with the effects of applying at least one delay metric according to at least one scenario of economic considerations, and thereinafter effecting a modification of the metric used or of the economic consideration used by the aggregating module whenever the comparing of a simulated metric or simulated scenario substantially improves on the metric or scenario used by the aggregating module.

14. The device according to claim 8 wherein at least one service module is associated with the assigning module or with the storage module, the service module including at least one data communications task selected from the list: traffic monitoring, traffic shaping, encryption, decryption, security filtering, traffic logging, traffic aggregation, traffic fragmentation, or traffic route modification.

15. A method for economically sub-optimizing interactions in data communications network environments, the method comprising the steps of:
   (a) aggregating a statistical profile of data communications, substantially from a vantage of a predetermined node, wherein said node is located between firstly an isolatable sub-network of the network environment having at least one interactive participant and secondly a preponderance of the remaining network environment;
   (b) electing at least one data communications traffic load threshold from the statistical profile according to a substantially economic consideration;
   (c) substantially at the node, assigning a parametric data transfer delay interval to each data communication exceeding the threshold;
   (d) effecting the delay by storing each assigned data communication for the interval before transferring said data communication substantially across the node, wherein the sub-network includes a participant of the at least one interactive participant, said participant being a sender or an intended receiver of said data communication.

16. The method according to claim 15 wherein aggregating a statistical profile of data communications includes traffic load metrics with respect to a variable selected from the list: time of day, day of week, day of month, day of year, sender, categorization of sender, intended receiver, categorization of intended receiver, size of data communications, media content category of data communications, transactional category of data communications, or rate structure effecting data communications.

17. The method according to claim 15 wherein a computer is the participant of the at least one interactive participant.

18. The method according to claim 17 wherein the computer is substantially operating according to interactive human control.

19. The method according to claim 15 wherein the preponderance of the remaining network environment includes a wide area network or a portion thereof.

20. The method according to claim 15 wherein a substantially economic consideration relates to either an aspect of a monetary payment rate structure effecting data communications or to an aspect of a monetary payment rate structure effecting time of the participant of the at least one interactive participants.

21. The method according to claim 15 wherein the assigning of a parametric data transfer delay interval is determined according to an econometric model.

22. The method according to claim 15 wherein the assigning of a parametric data transfer delay interval is determined according to a feedback model.

23. A device for effecting delay in a data communications network environment, wherein the device has two sides to be connected in the environment substantially as a non bypassable interconnection between on one side at least one interactive participant of an isolatable sub-network of the environment and on the other side a preponderance of the remaining environment, the device comprising:
   (a) a receiving port for accepting data communications on either side of the two sides, and the receiving port designates each data communication with the side appropriate for its eventual transmission;
   (b) a transfer delay interval assigning module connected to the receiving port, said assigning module associating a delay interval metric to each data communication that is exceeding a predetermined traffic load threshold metric;
   (c) a data communications storage module connected to the assigning module, wherein each data communication is stored therein for the associated delay interval; and
   (d) a transmitting port connected to the storage module, said transmitting port being for transmitting each data communications on the appropriate side as designated by the receiving port.

24. The device according to claim 23 wherein an aggregating module is connected to the assigning module or to the storage module, and said aggregating module aggregates a statistical profile of data communications.

25. The device according to claim 24 wherein an electing module is connected to the aggregating module on one side and to the assigning module on the other side, the electing module electing at least one data communications traffic load threshold from the profile of the aggregating module according to a substantially economic consideration.

26. The device according to claim 25 wherein, at predetermined times or according to predetermined conditions, an updating is performed on the profile of the aggregating module for access by the electing module.

27. The device according to claim 25 wherein a simulation module is associated with the electing module or with characterizations of an updated profile prior to the profiles access by the electing module, said simulation module substantially comparing the delay metric in use with the effects of applying at least one delay metric according to at least one scenario of economic considerations, and thereinafter effecting a modification of the metric used or of the economic consideration used by the aggregating module whenever the comparing of a simulated metric or simulated scenario substantially improves on the metric or scenario used by the aggregating module.

28. The device according to claim 26 wherein a simulation module is associated with the electing module or with characterizations of an updated profile prior to the profiles access by the electing module, said simulation module substantially comparing the delay metric in use with the effects of applying at least one delay metric according to at least one scenario of economic considerations, and thereinafter effecting a modification of the metric used or of the economic consideration used by the aggregating module whenever the comparing of a simulated metric or simulated scenario substantially improves on the metric or scenario used by the aggregating module.

29. The device according to claim 23 wherein at least one service module is associated with the assigning module or with the storage module, the service module including at least one data communications task selected from the list: traffic monitoring, traffic shaping, encryption, decryption, security filtering, traffic logging, traffic aggregation, traffic fragmentation, or traffic route modification.

30. A device for effecting delay in a data communications network environment, wherein the device has more than two sides, to wit: an aggregation of at least one of the more that two sides for connecting to at least one interactive participant of an isolatable sub-network of the environment and the remaining at least one side of the more than two sides for connecting to a preponderance of the remaining environment, the device comprising:

(a) a receiving port for accepting data communications on any one of the more than two sides and the receiving port designats each data communication with at least one side of the other sides as appropriate for its eventual transmission, (b) a transfer delay interval assigning module connected to the receiving port, said assigning module associating a delay interval metric to each data communication that is exceeding a predetermined traffic load threshold metric;

(c) a data communications storage module connected to the assigning module, wherein each data communication is stored therein for the associated delay interval; and (d) a transmitting port connected to the storage module, said transmitting port being for transmitting each data communications on each side so designated by the receiving port.

31. The device according to claim 30 wherein an aggregating module is connected to the assigning module or to the storage module, and said aggregating module aggregates a statistical profile of data communications.

32. The device according to claim 31 wherein an electing module is connected to the aggregating module on one side and to the assigning module on the other side, the electing module electing at least one data communications traffic load threshold from the profile of the aggregating module according to a substantially economic consideration.

33. The device according to claim 32 wherein, at predetermined times or according to predetermined conditions, an updating is performed on the profile of the aggregating module for access by the electing module.

34. The device according to claim 32 wherein a simulation module is associated with the electing module or with characterizations of an updated profile prior to the profiles access by the electing module, said simulation module substantially comparing the delay metric in use with the effects of applying at least one delay metric according to at least one scenario of economic considerations, and thereinafter effecting a modification of the metric used or of the economic consideration used by the aggregating module whenever the comparing of a simulated metric or simulated scenario substantially improves on the metric or scenario used by the aggregating module.

35. The device according to claim 33 wherein a simulation module is associated with the electing module or with characterizations of an updated profile prior to the profiles access by the electing module, said simulation module substantially comparing the delay metric in use with the effects of applying at least one delay metric according to at least one scenario of economic considerations, and thereinafter effecting a modification of the metric used or of the economic consideration used by the aggregating module whenever the comparing of a simulated metric or simulated scenario substantially improves on the metric or scenario used by the aggregating module.

36. The device according to claim 30 wherein at least one service module is associated with the assigning module or with the storage module, the service module including at least one data communications task selected from the list: traffic monitoring, traffic shaping, encryption, decryption, security filtering, traffic logging, traffic aggregation, traffic fragmentation, or traffic route modification.

37. The device according to claim 30 wherein the isolatable sub-network is substantially identical to a preponderance of the remaining environment.

38. The device according to claim 37 wherein an aggregating module is connected to the assigning module or to the storage module, and said aggregating module aggregates a statistical profile of data communications.

39. The device according to claim 38 wherein an electing module is connected to the aggregating module on one side and to the assigning module on the other side, the electing module electing at least one data communications traffic load threshold from the profile of the aggregating module according to a substantially economic consideration.

40. The device according to claim 39 wherein, at predetermined times or according to predetermined conditions, an updating is performed on the profile of the aggregating module for access by the electing module.

41. The device according to claim 39 wherein a simulation module is associated with the electing module or with characterizations of an updated profile prior to the profiles access by the electing module, said simulation module substantially comparing the delay metric in use with the effects of applying at least one delay metric according to at least one scenario of economic considerations, and thereinafter effecting a modification of the metric used or of the economic consideration used by the aggregating module whenever the comparing of a simulated metric or simulated scenario substantially improves on the metric or scenario used by the aggregating module.

42. The device according to claim 40 wherein a simulation module is associated with the electing module or with characterizations of an updated profile prior to the profiles access by the electing module, said simulation module substantially comparing the delay metric in use with the effects of applying at least one delay metric according to at least one scenario of economic considerations, and thereinafter effecting a modification of the metric used or of the economic consideration used by the aggregating module whenever the comparing of a simulated metric or simulated scenario substantially improves on the metric or scenario used by the aggregating module.

43. The device according to claim 37 wherein at least one service module is associated with the assigning module or with the storage module, the service module including at least one data communications task selected from the list: traffic monitoring, traffic shaping, encryption, decryption, security filtering, traffic logging, traffic aggregation, traffic fragmentation, or traffic route modification.

\* \* \* \* \*